(12) United States Patent
Rozak

(10) Patent No.: US 6,694,262 B2
(45) Date of Patent: Feb. 17, 2004

(54) METHOD FOR DETERMINING GEOLOGIC FORMATION FRACTURE POROSITY USING GEOPHYSICAL LOGS

(76) Inventor: Alexander T. Rozak, 24 Melford Place S.W., Calgary, Alberta (CA), T2V 2E8

( * ) Notice: Subject to any disclaimer, the term of this patent is extended or adjusted under 35 U.S.C. 154(b) by 10 days.

(21) Appl. No.: 09/994,057

(22) Filed: Nov. 27, 2001

(65) Prior Publication Data

US 2002/0059028 A1 May 16, 2002

Related U.S. Application Data

(63) Continuation-in-part of application No. 09/542,045, filed on Mar. 31, 2000, now abandoned.

(51) Int. Cl.$^7$ ................................................. G01V 3/08
(52) U.S. Cl. ............................................. 702/7; 702/12
(58) Field of Search ........................... 702/6, 7, 12, 13; 324/338, 339

(56) References Cited

U.S. PATENT DOCUMENTS

| | | | |
|---|---|---|---|
| 4,716,973 A | | 1/1988 | Cobern |
| 4,899,112 A | * | 2/1990 | Clark et al. ................. 324/338 |
| 4,931,736 A | | 6/1990 | Barlai et al. |
| 4,961,343 A | | 10/1990 | Boone |
| 5,355,088 A | | 10/1994 | Howard, Jr. |
| 5,379,216 A | | 1/1995 | Head |
| 5,519,668 A | | 5/1996 | Montaron |
| 5,663,499 A | | 9/1997 | Semmelbeck et al. |
| 5,869,968 A | * | 2/1999 | Brooks et al. ............... 324/338 |

FOREIGN PATENT DOCUMENTS

EP 0363259 11/1990

OTHER PUBLICATIONS

Puri, R.; King, G.E.; Palmer, I.D., "Damage to Coal Permeability During Hydraulic Fracturing", Proceedings of the 1991 Coalbed Methane Symposium, 1991, The University of Alabama/Tuscaloosa.

* cited by examiner

*Primary Examiner*—Donald E. McElheny, Jr.
(74) *Attorney, Agent, or Firm*—Blake, Cassels & Graydon LLP; Terry L. Leier

(57) ABSTRACT

A novel method for measuring fracture porosity in coal seams is disclosed. Knowledge of fracture porosity is critical to methane production from coal seams as fractures form the main permeable pathways for gas migration. The disclosed invention can be used to determine likely locations where commercially significant amounts of fracturing have occurred in the coals. These locations pose prime targets for methane exploration, and the disclosed invention comprises a significant new tool in methane exploration. The disclosed invention uses existing geophysical well log data, a screening process and calculations based on the characteristics of the fluid used to drill the hole. Using these data, the volume of invaded coal is determined, as well as the volume of drilling fluid available to create this invasion. The volume fraction of the invading drilling fluid divided by the volume of the invaded rock produces a measure of the fracture porosity of the coal. Locations that exhibit higher values of fracture porosity are more commercially attractive as methane exploration targets.

7 Claims, 4 Drawing Sheets

METHOD FOR DETERMINING GEOLOGIC FORMATION FRACTURE POROSITY USING GEOPHYSICAL LOGS

CROSS REFERENCE TO RELATED APPLICATIONS

This is a continuation-in-part of application Ser. No. 09/542,045 filed Mar. 31, 2000, now abandoned.

FIELD OF THE INVENTION

This invention relates to evaluation of geological information and more particularly relates to analysis of geophysical data to determine the porosity of a geologic formation.

BACKGROUND OF THE INVENTION

Fracture detection in coal seams is critical for the recovery of economic quantities of methane. Coal is a dual porosity medium, comprising a matrix containing abundant micro-scale pores intersected by larger macro-scale fractures. The micro-scale pores are of the size that gas movement occurs via diffusion, resulting in a very slow rate of gas exchange per unit volume. The larger macro-scale fractures act as the conduits for connecting the gas-diffusing matrix to a well bore. For economic quantities of methane to be recoverable, extensive well-developed macro-scale fractures must be present to connect a large enough volume of coal matrix such that the total volume of gas diffused becomes significant. Thus, the detection of subsurface fracture systems is critical for delineating desirable locations for methane exploration.

During the drilling of a wellbore, drilling mud is pumped into the well in order to flush rock chips and other unwanted debris from the well bore as it is being drilled. The drilling mud is introduced into the wellbore under pressure, where the mud pressure is slightly greater than the pressure of a formation traversed by the wellbore to prevent escape of material from the formation through the well bore, a phenomenon known as well blowout. The resultant differential pressure between the mud well bore column pressure and the formation pressure forces mud filtrate into the permeable formation, and solid particles of the mud are deposited on the wellbore wall, forming a mudcake.

The mudcake usually has a very low permeability, and once developed, considerably reduces the rate of further mud filtrate invasion into the wellbore wall. In a region very close to the wellbore wall, most of the original formation may be flushed away by the mud filtrate. This region is known as the "flushed zone" or the "invaded zone". If the flushing is complete, the flushed zone pore space contains only mud filtrate.

Further out from the wellbore wall, the displacement of the formation fluids by the mud filtrate is less and less complete. This results in a second region, this region undergoing a transition from mud filtrate saturation to original formation water saturation. The second region is known as the "transition zone". The extent or depth of the flushed and transition zones depends on many parameters. Among them is the type and characteristics of the drilling mud, the formation porosity, the formation permeability, the pressure differential and the time since the well was first drilled. The undisturbed formation beyond the transition zone is known as the "uninvaded, virgin or uncontaminated zone".

FIGS. 1 and 2 show prior art representations of an invasion and resistivity profile in a water-bearing zone. FIG. 1 illustrates a cross section of a wellbore showing the locations of the mud cake 8 formed on the inner surface of the well bore by the drilling mud, the flushed zone, the transition zone and the uninvaded zone extending radially from the wellbore wall. FIG. 2 illustrates the formation of a mud cake 8 by the drilling mud along the well bore wall and a radial distribution of formation resistivity extending radially from the wellbore wall, into the flushed zone, into the transition zone, and into the uninvaded zone. Sometimes, in oil and gas bearing formations, where the mobility of the hydrocarbons is greater than that of the water, because of relative permeability differences, the oil or gas moves away faster than the interstitial water. In this case, there may be formed, between the flushed zone and the uninvaded zone, an "annular zone or annulus", with a high formation water saturation. Annuli probably occur in most hydrocarbon bearing formations; and their influence on measurement depends on the radial location of the annulus and its severity.

The existence of these zones (the flushed, transition, annular and uninvaded zones) influence resistivity log measurements and therefore the accuracy of the resistivity log itself. In it's conventional use, the resistivity log is used to determine if oil exists in the formation traversed by the wellbore. The main interest of the resistivity log, shown in the upper portion 10 of the graph of FIG. 2, is to obtain the true and correct value of the resistivity (reciprocal of the conductivity) of the uninvaded zone, Rt in the graph. High values of Rt indicate the presence of an insulator, possibly oil, in the formation. Conventionally, it is therefore desirable to correct for the effect of mud filtrate invasion on formation resistivity.

Conventionally, mud filtrate invasion analysis from resistivity logs is attempted by qualitative inspection of the separation between measurement displays representing different depths of investigation. The purpose of this analysis is to determine the radial geometric function of the logging tool response in order to correct for invasion and generate a more accurate value of Rt. It is desirable to have a method for determining geological formation fracture porosity that does not rely on values of Rt.

Conventional log analysis techniques require correction for hydrocarbon saturation in the void spaces of the geologic formation, and are complicated by depth based variation in the hydrocarbon saturation gradient through the flushed zone/uninvaded zone interface that may confuse invasion character. Variations in drilling mud properties between wells that change the radial resistivity profile and differences in the properties of the formation water can cause errors in conventional interpretation. As well, laboratory measurements of fracture porosity in coal may not be applicable to the bulk reservoir properties due to sampling error, the inherent friability of coal, and the sensitivity of coal to changes in stress regime. It is desirable to have a basis for analysis that does not require correction for hydrocarbon saturation or depth based variations.

After an exploration well is drilled, specialized tools are lowered down into the bore hole to test and record the responses of the different rock formations to various electrical, acoustic and radioactive stimuli. This process is termed geophysical logging, and the recorded data are termed geophysical logs. In one petroleum producing region of the world, the Western Canada Sedimentary Basin, approximately 280,000 wells have been drilled to date, and geophysical logs exist for virtually all of them. Geophysical logs have been used extensively in the past in conventional oil and gas exploration, but little data exist on their use in fracture detection in coal.

Some highly specialized geophysical logs are able to detect fractures in coal under very specific conditions, but the data are prone to error and the logging techniques have seen limited use. Advancement in the art delineated by the disclosed invention is that a large portion of previously unused data can now be processed for a new and useful result.

Various geophysical techniques exist to detect mud filtrate invasion and/or mudcake. One such device is an electrical pad containing regularly spaced electrodes. As the pad moves across the target formation, variations between the voltages are recorded, detecting the existence of mudcake on the borehole wall. This device relies on a solid contact with the bore hole wall and any variations in the size of the hole can disrupt its operation. This is significant as, over time, coals tend to cave-in resulting in rugose and irregular bore holes, thus limiting the utility of the pad contact type device.

Other types of electrical logging devices exist, but all have the goal of determining the rock properties away from the invasive and damaging effects of the well bore. In general, most of these devices are able to detect the depth accurately that the drilling fluid has invaded. However, because of the complex geometry of the pore spaces in conventional clastic and carbonate reservoir rocks and variation in hydrocarbon saturation, invasion has not been previously considered a quantifiable indicator of porosity.

U.S. Pat. No. 5,663,499 discloses a method for estimating permeability using geophysical well log data. This method interprets data from a multi-array induction device having at least five resistivity measures for a given formation and uses a variety of complex estimates, measurements and calculations. The measurements required include estimates of gas gravity, cementation factor, saturation exponent, shale volume and, and many others. The method requires a specialized logging apparatus to generate the required data and is unable to examine pre-existing data.

European patent EP0363259 discloses a method for interpreting data from a formation micro-scanner, a pad contact type of device, to detect and estimate width of fractures intersecting a borehole. It is limited in use and unable to examine pre-existing data.

U.S. Pat. No. 5,379,216 discloses a method and a highly specialized apparatus for measuring invading volumes of mud filtrate to determine relative measurements of permeability. However, this patent is limited to analysis of data generated by its own disclosed apparatus, and is unable to analyze pre-existing data for indications of fracture porosity.

U.S. Pat. No. 4,961,343 discloses a method for determining permeability of a subsurface earth formation in real time during drilling operations through monitoring volumes of drill fluid lost into the formation and volumes of gas liberated. Geophysical log responses are not used. As well, this patent is limited in utility as no means of examining pre-existing data is disclosed.

SUMMARY OF THE INVENTION

This invention relates to a method for determining fracture porosity in coals using existing well bore induction logging data produced by an induction tool disposed in the well bore. The disclosed invention uses conventional well log data in an unconventional manner to determine new and useful information regarding well bore formation properties, specifically the amount of fracture porosity.

The invention provides a method of analysis to determine geologic formation fracture porosity that does not rely on formation resistivity, Rt.

The disclosed invention is volume based and requires no correction for hydrocarbon saturation or depth based variations. As all effectively connected fractures in coal are filled with water, hydrocarbon saturation variations are immaterial. Variations in mud properties are screened out or are of no impact to the disclosed invention, as the true value of Rt is irrelevant. As well, data used in the disclosed invention are collected from the formation in situ, with the coals under actual temperature and pressure conditions and are more representative of the bulk reservoir properties. In accordance with the present invention, fracture porosity calculations in coal are performed in the volume domain. Use of a volume domain mud filtrate invasion analysis minimizes the effect of all of these variables and is useful for comparing well to well and between zones within a well for determining measures of fracture porosity, and hence, methane production potential in the coal seams.

This invention relates methods of detecting fracturing in rock using geophysical logs, and in particular the geophysical log data produced by electrical type logging devices. The disclosed invention seeks to remedy these deficiencies in the prior art of fracture detection in coal through a method that incorporates data previously unused for determination of formation fracture porosity into a new and useful result. Coals are uniquely suited to this method, as the fractures tend to occur in a regularly spaced orthogonal geometry. This type and pattern of fracturing simplifies the determination of invading and invaded volumes.

As well, coals comprise a special case where only fractures that are effectively connected to the borehole are available to invasion of drilling fluids. Fracture porosity is then directly related to the volume of coal effectively connected for gas diffusion, and therefore, is a major indicator of economic methane production. The disclosed invention represents a significant advancement in the art as previously by-passed reservoirs of methane can now be found.

The disclosed invention screens existing geophysical well logs to ensure reliable data by discarding wells where the resistivity of the drilling mud (Rm) is less than 1.0. Experience has shown that below this value, induction logs are affected by the conductivity of the drilling mud and unreliable values of depth of invasion are produced. A second screening procedure involves the examination of the borehole caliper log. This log measures the size of the borehole. Measurements of the borehole diameter that exceed 200% of the bit size are considered unreliable and screened out.

Measurements of the thickness of the coal seam of interest, the bit size and the depth of invasion of drilling fluids define an invaded volume of coal.

From records of the characteristics of the drilling fluid, a measure of the amount of fluid available to create this invasion can be made. The volume of fluid available for invasion is then divided by the volume of the invaded rock. The resulting volume fraction equals the effective void space occupied by the invading fluid.

In coal, this volume fraction of effective void space is fracture porosity, as only fractures are able to accept invading fluids; as the coal of the formation matrix is impermeable. The disclosed invention outlines a new, useful and unconventional method for interpreting previously unused data and delineating methane exploration targets.

In one of its aspects, the invention provides a method for identifying fractures in coal seams using geophysical log records recording measurements of well data including induction type geophysical data relating to a well bore comprising providing at least one geophysical log record recording measurements of well data including data induction type geophysical data, selecting log records acceptable for use and calculating a formation porosity.

In another of its aspects, the invention provides a method for identifying fractures in coal seams using measurements of drilling fluid resistivity, drilling fluid loss, surface area of the filter used to measure drilling fluid loss, well bore hole diameter, drill bit size, thickness of the coal seam, measurements of shallow, medium and deep resistivities of the coal seams taken from geophysical logs, said method comprising a first screening step selecting only geophysical logs exhibiting resistivity of drilling mud greater than 1.0 ohm-meter. These geophysical logs are then screen for a bore hole caliper size through a target zone of each said selected geophysical is less than 200% of bit size.

For each screened, selected geophysical log, the following steps are performed, namely, calculating a first ratio from a value of medium resistivity derived from the data of said selected geophysical log divided by a value of deep resistivity derived from the data of said selected geophysical log. Then a second ratio is calculated from a value of shallow resistivity derived from the data of said selected geophysical log divided by said value of deep resistivity. A depth of invasion is determined from the first and second ratios. A fluid affected volume is calculated from the square of the sum of a radius of a well bore bit size plus the depth of invasion, the square of the sum being multiplied by pi and by a thickness of the target zone. A volume of invaded coal is calculated from the fluid affected volume less the product of the square of said radius of a well bore bit size, times pi, times the thickness of the target zone. A volume of invading fluid is calculated from a drilling fluid loss measurement of the selected geophysical log well log and corrected for time and filter surface area. A fracture porosity is calculated as the ratio of said volume of invading fluid divided by said volume of invaded coal.

DESCRIPTION OF THE PREFERRED EMBODIMENT

Figure 1:
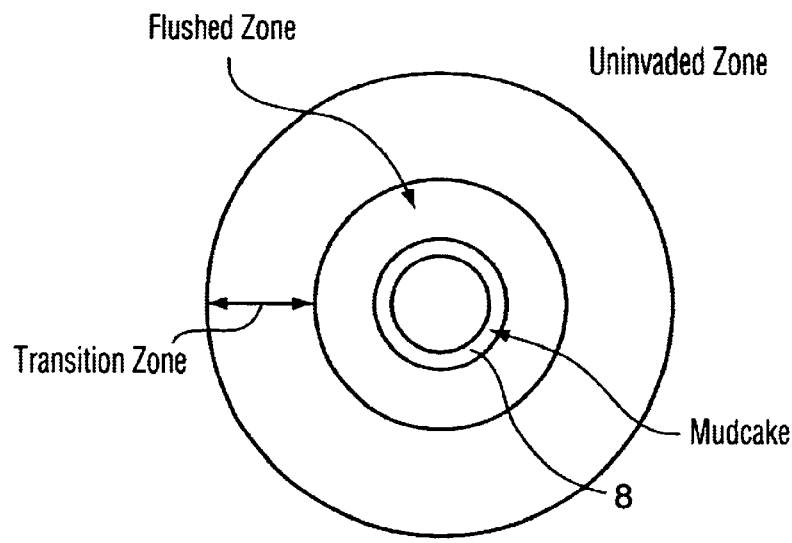
FIG. 1, illustrates a cross section of a wellbore showing the locations of the flushed zone, the transition zone and the uninvaded zone extending radially from the wellbore wall.
Figure 2:
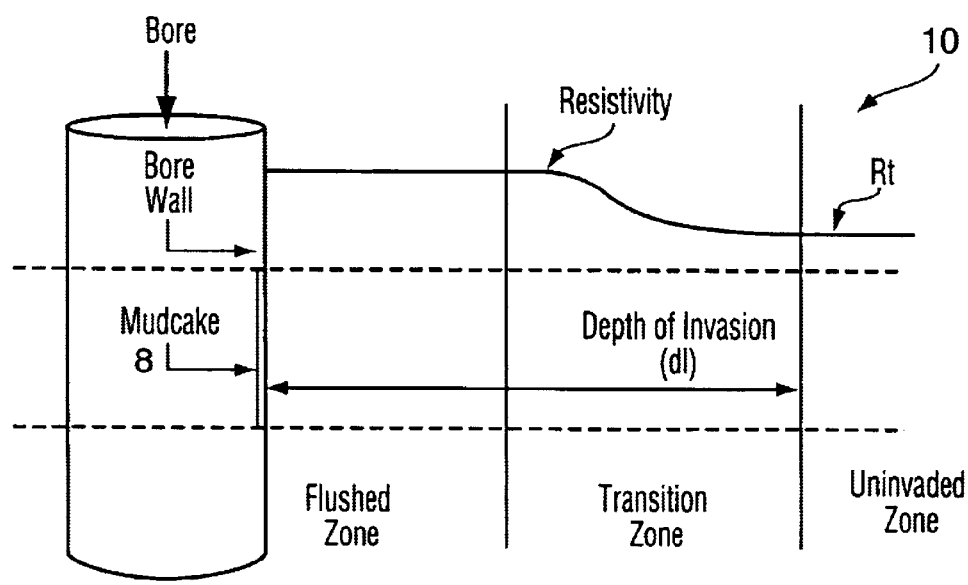
FIG. 2 illustrates a radial distribution of formation resistivity extending radially from the wellbore wall, into the flushed zone, into the transition zone, and into the uninvaded zone.
Figures 3, 4:
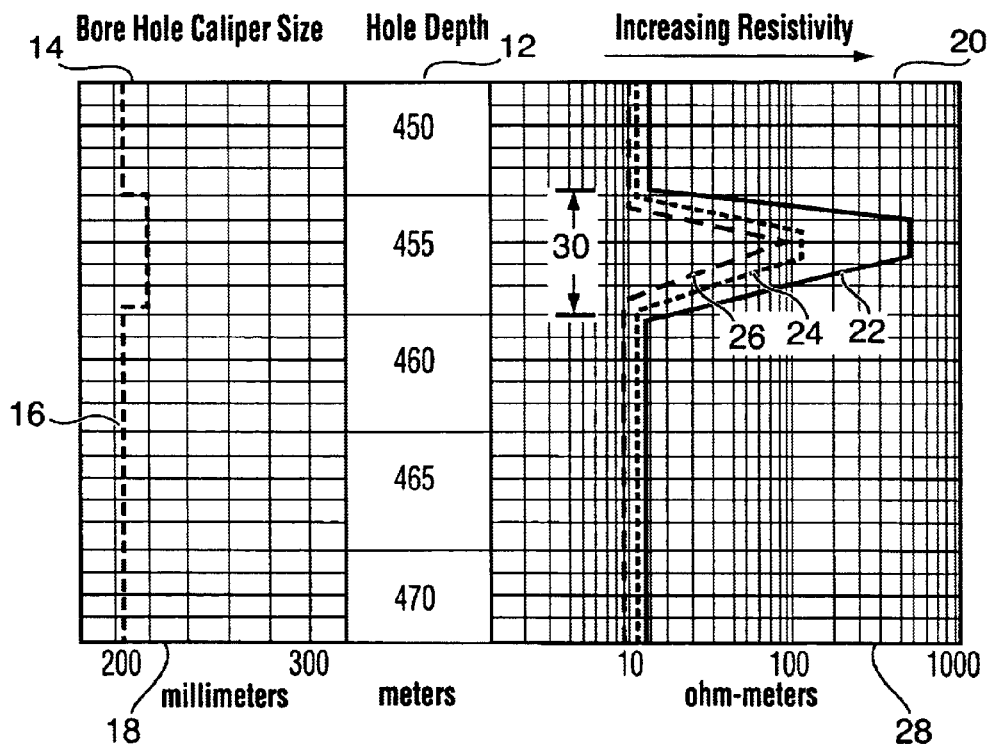
FIG. 3 is a representation of a typical prior art well log header record, showing various data collected from drilling and logging operations.
FIG. 4 illustrates typical prior art bore hole caliper and induction geophysical logs extending over a coal interval.

FIG. 3 illustrates the information shown on a typical well log header of an induction type geophysical log.

Figure 6:
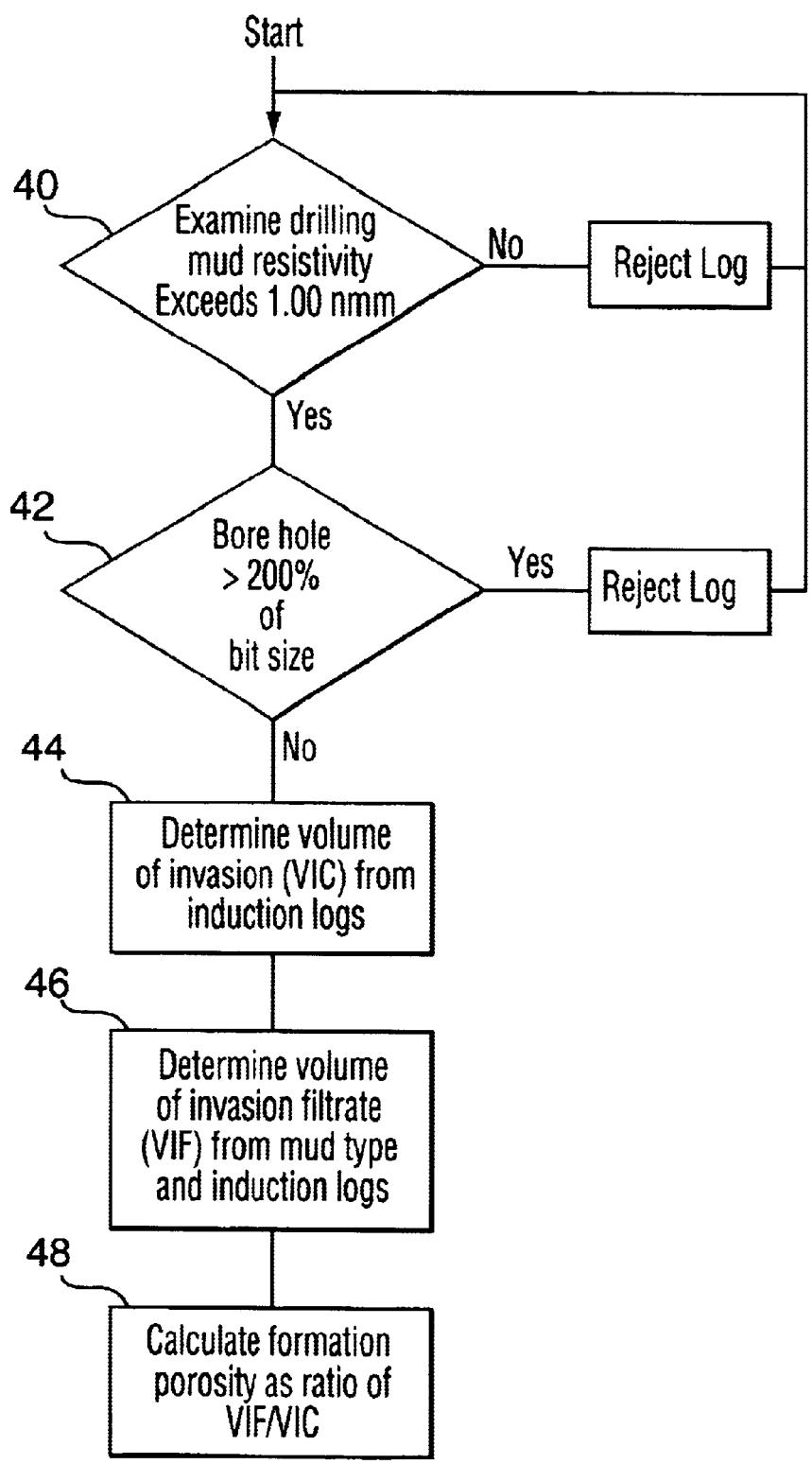
FIG. 6 is a flow chart showing an embodiment of the steps of method of the present invention.

In accordance with the invention a first data screening procedure is done based on the information contained in the well log header. The first data screening is to eliminate well log data from wells that have a drilling mud resistivity Rm that is less than 1.0 ohm meters (ohmm). When drilling mud having a resistivity below this value is used, the induction logs produced by the well logging equipment are affected by the conductivity of the drilling mud, which consequentially results in unreliable values of depth of invasion being produced. The data captured in the well log header of FIG. 3 has a drilling mud resistivity of 3.0 ohmm at 15° Celsius, which greater than the 1.0 ohmm threshold. Thus, the well data corresponding to this well log header is therefore useful for further analysis in accordance with the method of the subject invention. This screening step of the method is shown as decision box 40 in the flowchart of FIG. 6.

To practice the method of the invention the following data from such a log header is pertinent:

TABLE 1

| Pertinent Data from a well log header | |
|---|---|
| Resistivity of the drilling mud ($R_m$) | 3.0 ohmm at 15° Celsius |
| Fluid Loss (Water Loss WL) | 7.0 cm$^3$ |
| Bit Size (bts) | 200 mm |

FIG. 4 illustrates a typical prior art geophysical log chart that records or logs parameter measurements taken along the depth of the well. The geophysical log chart of FIG. 4 corresponds to and provides in-bore measurements for the well of the well log header of FIG. 3. The geophysical log chart provides well bore information along a depth axis, namely, the central column 12 of the chart. In the left column 14 of the chart is a caliper log showing a trace 16 of well bore caliper size, in millimeters with reference to the horizontal axis 18. The well bore caliper size is measured with reference to or in relation to hole depth, which is expressed in meters with reference to the vertical axis of column 12.

In accordance with the method of analysis of the invention, a second data screening procedure is done. In the second data screening, the ratio of well bore caliper size to drill bit size should not exceed 200%. The drill bit size (bts) is given in the well header and is also listed in Table 1 as 200 mm. By inspection of the bore hole caliper size trace 16 shown in the left column 14 of the well bore log of FIG. 4, it is noted the trace never exceeds is 220 mm. Thus the ratio of bore hole caliper size is always less than 200% of the bit size. Therefore, the caliper log data meet the second screening criteria of the method and, consequently, the geophysical data of the well log chart are acceptable for use. This screening step of the method is shown as decision box 42 in the flowchart of FIG. 6.

The next step is to determine the volume of the coal invaded by the drilling mud, which is referred to herein as the volume of invaded coal (VIC). This step of the method is shown as process box 44 in the flowchart of FIG. 6. The volume of coal invaded by the drilling mud can be determined from the depth of invasion (di), the bit size (bts) and the thickness (th) of the coal seam.

Figure 5:
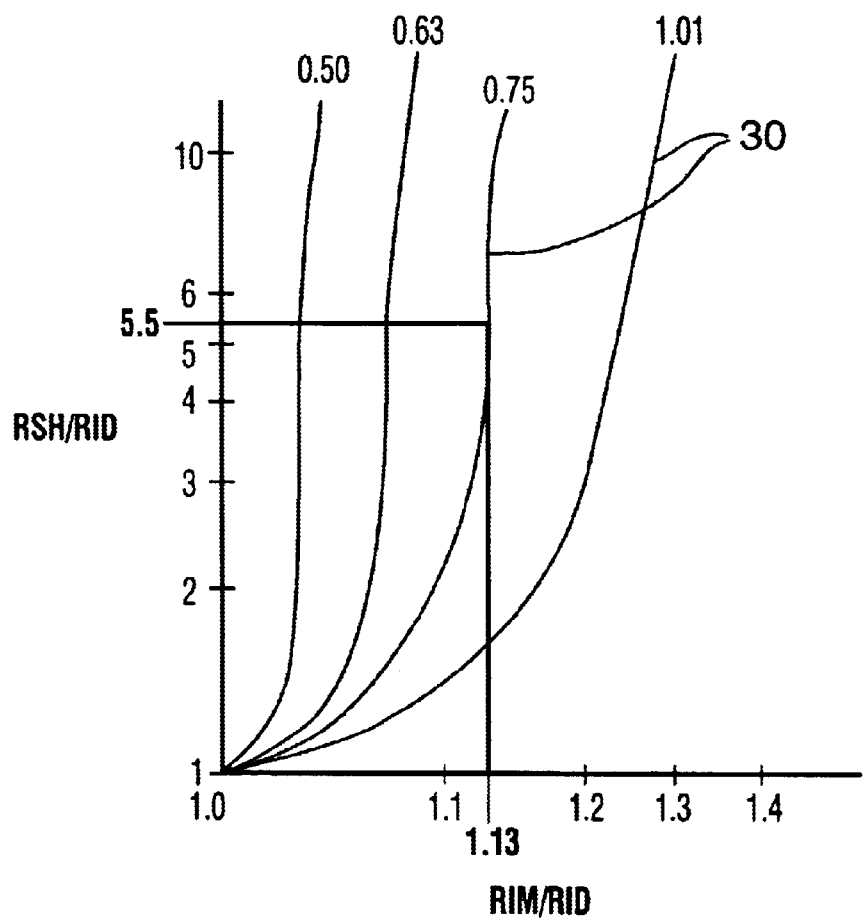
FIG. 5 is a prior art chart used to determine the depth of mud filtrate invasion.

The depth of invasion (di) is calculated from the induction logs of FIG. 4 using the conversion chart of FIG. 5. The right column 20 of the well log chart provides an induction geophysical log in relation to hole depth. The induction geophysical log is composed of three traces 22, 24 and 26 of resistivity, in ohm-meters with reference to the horizontal axis 28, corresponding to well bore depth, in meters with reference to the vertical axis of column 12. In the well log resistivity traces of the right column 20, the solid line trace 22 represents the resistivity reading produced by a shallow-reading resistivity device. The trace of dotted line 24 represents the resistivity reading produced by a medium-reading resistivity device and the trace of long dashed line 26 represents resistivity reading produced by a deep-reading resistivity device. The resistivity is recorded in ohm-meters on a logarithmic scale of axis 28.

The traces 22, 24 and 26 show excursions in the well bore depth range approximately extending from 453.0 m to 457.6 meters. These excursions indicate coal is present over range 30 of well bore depth. In the geophysical log of FIG. 4, the following data of range 30 are selected and recorded in Table 2.

TABLE 2

Pertinent data collected from the caliper log and induction log

| | |
|---|---|
| Bore Hole Caliper Size | 220 mm |
| Coal Seam Thickness (th) | 4.6 meters |
| Deep Resistivity (RID) | 100 ohmm |
| Medium Resistivity (RIM) | 113 ohmm |
| Shallow Resistivity (RSH) | 550 ohmm |

The Bore Hole Caliper Size of Table 2 is obtained from the trace 16 in the range 30 of interest in FIG. 4. The Coal Seam Thickness of Table 2 is calculated from the well bore depth over which region 30 extends.

The Deep Resistivity (RID) of Table 2 is the peak excursion of the deep resistivity trace 26 in the region 30 of interest. The Medium Resistivity (RIM) of Table 2 is the peak excursion of the medium resistivity trace 24 in the region 30 of interest. The Shallow Resistivity (RSH) of Table 2 is the peak excursion of the shallow resistivity trace 22 in the region of interest.

From the data in Table 2 above, the following ratios are calculated and recorded and set out in Table 3:

TABLE 3

Ratios of resistivity readings

| | |
|---|---|
| RIM/RID (113/100) | 1.13 |
| RSH/RID (550/100) | 5.5 |

These ratios are used to determine the depth of mud filtrate invasion into the surrounding geological formation (di) using industry-standard interpretation charts that are published by well-log service companies, for example Schlumberger Corporation.

FIG. 5 is a representation of one such prior art interpretation chart. The horizontal axis of the chart of FIG. 5 extends over a range of Medium Resistivity (RIM) to Deep Resistivity (RID) ratios of 1.0 to 1.4. At the present, it appears that a ratio of Medium Resistivity (RIM) to Deep Resistivity acceptable for use is a ratio which is less than 2. Research into production data from the San Juan Basin in New Mexico shows that when this ratio exceeds 2.0, the zones are either non-productive, or the data generated are uninterpretable.

The vertical axis of the chart of FIG. 5 extends over a range of Shallow Resistivity (RSH) to Deep Resistivity (RID) ratios of 1 to 10. The plurality of substantially vertically extending traces 30 of the chart provides an indication of the depth of invasion of the well mud in the formation in meters, the traces individually identified as 0.50, 0.63, 0.75 and 1.01 meters. By plotting the ratios from Table 3 onto the chart in FIG. 5, a depth of invasion, (di), of mud filtrate of 0.75 meters is determined.

Once the depth of invasion (di) has been determined, the VIC is determined from two volume calculations. First the volume of a cylinder defined by the diameter of the bit plus the depth of invasion and a height of the thickness of the coal seam is calculated. As coal seams tend to cave over time, the bit size is most indicative of borehole size in the critical few hours after bit penetration when the invasion of the coal seam by the drilling mud occurred. Once the volume of this cylinder is determined, the volume of the borehole is subtracted to yield a volume of invaded coal (VIC). The calculation is outlined in Formula 1.

$$VIC = (((di+bts/2)^2 \times \Pi \times th) - (bts/2)^2 \times \Pi \times th \quad \text{(Formula 1)}$$

Substituting the values di=0.75 m, bts=0.2 m and th=4.6 m, it is determined that VIC=10.3 m³.

The next step is to determine the amount of fluid available to create this invaded volume of coal, which is referred to herein as the Volume of Invading Fluid (VIF). VIF is calculated from the properties of the drilling well fluid as recorded in the well log header and from the parameters recorded in the well log. This calculation process step of the method is shown as process box 46 in the flowchart of FIG. 6. From the well log header of FIG. 3, Fluid Loss (or water loss, WL) is listed at 7.0 cm³. This volume is determined from a standard American Petroleum Institute (API) drilling mud test. In accordance with the API test, the drilling mud to be delivered to the well being drilled, (which in this case is the Gel Chem drilling mud as shown in FIG. 3) is supplied under a pressure of 689.5 Kpa (100 psi) to a filter having a surface area of 45.8 cm² for a period of 30 minutes. The listed volume of 7.0 cm³ given in the log of FIG. 3, is the volume of fluid expelled through the filter over the 30 minute period of the API test.

To determine the VIF, the amount of time available for drilling mud invasion to occur is required. The time available for invasion is controlled by the sensitivity of the coal seam to formation damage. Research (Puri, R., King, G. E. and Palmer, I. D., 1991, Damage to Coal Permeability during Hydraulic Fracturing, Proceedings of the 1991 Coalbed Methane Symposium, University of Alabama, Tuscalosa, Ala., May 13–16, 1991) has shown that formation damage to coals can occur in about 24 hours (1440 minutes), after which permeability is effectively destroyed.

Formula 2 is an American Petroleum Institute standard formula for calculating total volume of fluid Qt passing through a mudcake in a given time based on the API water loss (WL) of the drilling fluid as recorded in the well header of FIG. 3.

$$Qt = WL \times (t/30)^{1/2} \quad \text{(Formula 2)}$$

Substituting t=1440 minutes (24 hours) and given the API water loss (WL) of 7.0 taken from the well log header data of FIG. 3, the total volume of invading fluid available Qt is calculated from Formula 2 as 48.5 cm³ over the 24 hour period.

The 689.5 Kpa pressure differential of the API test used to calculate the API water loss WL serves as a reasonably good proxy of the pressure differential between the pressure of the invading column of drilling fluid and the pressure in the coal seam being invaded by the drilling mud.

A Standardized Fluid Loss (SFL) specifying a volume of fluid per unit of filter surface area may be calculated. The fluid loss value divided by the area of the filter results in the following formula for Standardized fluid loss, namely:

$$SFL = \text{Fluid loss/filter area} \quad \text{(Formula 3)}$$

The fluid loss Qt over a 24 hour period was calculated as 48.5 cm³ using formula 2. This calculation of Qt is based on the API measurement of WL. As previously discussed, WL is a measurement of fluid loss based on an API standard test that uses a filter having a surface area of 45.8 cm². By substituting Qt, which is the fluid loss time corrected to 24 hours, and substituting the filter surface area of 45.8 cm², which is the filter surface area of the API test that the WL of the drilling fluid is measured from, a time corrected Standardized Fluid Loss ($SFL_{TC}$) is calculated as 1.06 cm³/cm².

With $SFL_{TC}$ determined, the total volume of invading filtrate is determined by calculating the surface area of the mud cake through which the invading filtrate passed. The surface area of the bore hole (SAbh) is calculated from the bit size (bts) and the thickness of the coal seam (th) using the following formula:

$$SAbh = bts \times \Pi \times th \quad \text{(Formula 4)}$$

Given that bts=0.2 m (from Table 1) and th=4.6 m (from Table 2), SAbh is calculated as 2.89 m² or 28,900 cm².

The volume of invading fluid (VIF) can be calculated from $SFL_{TC}$ and SAbh using the following formula:

$$VIF = SAbh \times SFL_{TC} \quad \text{(Formula 5)}$$

Substituting SAbh=28,900 cm² and $SFL_{TC}$=1.06 cm³/cm² yields a value of VIF=30,634 cm³ or 0.0306 m³.

With VIC and VIF now known, the volume fraction of void space, or porosity, can be calculated from the ratio of the volume of the invading fluid (VIF) to the volume of invaded coal (VIC). This calculation is depicted as process box 48 of the flowchart of FIG. 6. The ratio of VIF/VIC is representative of porosity as only fractures in the coal are available for invasion by the fluid. The resulting ratio value is fracture porosity ($\Phi_{FRAC}$).

Formula 6 outlines the calculation of $\Phi_{FRAC}$.

$$\Phi_{FRAC} = VIF/VIC \quad \text{(Formula 6)}$$

By substituting VIF=0.0306 m³ and VIC=10.3 m³, $\Phi_{FRAC}$ is calculated as 0.297%.

In this manner, the coal bed porosity is determined from existing well log data.

Now that the invention has been disclosed with reference to particular steps and embodiments, numerous substitutions and equivalents will occur to those skilled in the art. However, the invention is not to be limited to the particular steps and embodiments disclosed but rather is defined in the claims appended hereto.

I claim:

1. A method for identifying fractures in coal seams using measurements of drilling fluid resistivity, drilling fluid loss, surface area of the filter used to measure drilling fluid loss, well bore hole diameter, drill bit size, thickness of the coal seam, measurements of shallow, medium and deep resistivities of the coal seams taken from geophysical logs, said method comprising:
   a) a first screening step selecting only geophysical logs exhibiting resistivity of drilling mud greater than 1.0 ohm-meter;
   b) selecting at least one geophysical log using a second screening step against the geophysical logs selected in step a) wherein a bore hole caliper size through a target zone of each said selected geophysical is less than 200% of bit size; wherein for each selected geophysical log, the following steps are performed;
   c) calculating a first ratio from a value of medium resistivity derived from the data of said selected geophysical log divided by a value of deep resistivity derived from the data of said selected geophysical log;
   d) calculating a second ratio from a value of shallow resistivity derived from the data of said selected geophysical log divided by said value of deep resistivity;
   e) determining a depth of invasion from said first and second ratios;
   f) calculating a fluid affected volume from the square of the sum of a radius of a well bore bit size plus said depth of invasion, the square of the sum being multiplied by pi and by a thickness of said target zone;
   g) calculating a volume of invaded coal from said fluid affected volume less the product of the square of said radius of a well bore bit size, times pi, times said thickness of said target zone;
   h) calculating volume of invading fluid from a drilling fluid loss measurement of said selected geophysical log well log corrected for time and filter surface area;
   j) calculating a fracture porosity as the ratio of said volume of invading fluid divided by said volume of invaded coal.

2. A method for identifying fractures in coal seams using geophysical log records recording measurements of well data including induction type geophysical data relating to a well bore, said method comprising:
   a) providing at least one geophysical log record recording measurements of well data including induction type geophysical data;
   b) selecting log records containing:
      (i) a measured resistivity of a well drilling fluid greater than 1.0 ohm-meter;
      (ii) over a formation of interest:
         a bore hole caliper size over a region of interest of less than 200% of the bit size; and
         a measurement of medium resistivity and a measurement of deep resistivity wherein the quotient of said measurement of medium resistivity divided by said measurement of deep resistivity does not exceed two; and
   c) calculating a formation porosity.

3. The method of claim 2 wherein the step of calculating the formation porosity includes the steps of:
   a) determining a formation volume of invasion;
   b) determining a formation volume of invasion filtrate; and
   c) calculating the formation porosity as the quotient of said volume of invasion filtrate divided by said formation volume of invasion.

4. The method of claim 3 wherein the step of determining the formation volume of invasion includes the steps of:
   a) determining a shallow resistivity representative of the formation of interest;
   b) determining a medium resistivity representative of the formation of interest;
   c) determining a deep resistivity representative of the formation of interest;
   d) determining a depth of invasion from a ratio of said shallow resistivity to said deep resistivity and a ratio of said medium resistivity to said deep resistivity; and
   e) calculating the volume of a cylinder having an outer diameter of said depth of invasion extending over the length of the formation of interest and excluding the volume of the well bore calculated from a cylinder formed by the well bit size.

5. The method of claim 3 wherein the step of determining the volume of formation filtrate includes the steps of:
   a) determining a volume of fluid based on the measured water loss of the drilling mud provided in the well header log data corrected for time and filter area.

6. The method of claim 5 wherein the correction for time is based on a time period of 24 hours.

7. The method of claim 5 wherein the correction for filter area is based on the mud cake surface area surrounding the well bore along the formation of interest.

\* \* \* \* \*